Patented Oct. 24, 1922.

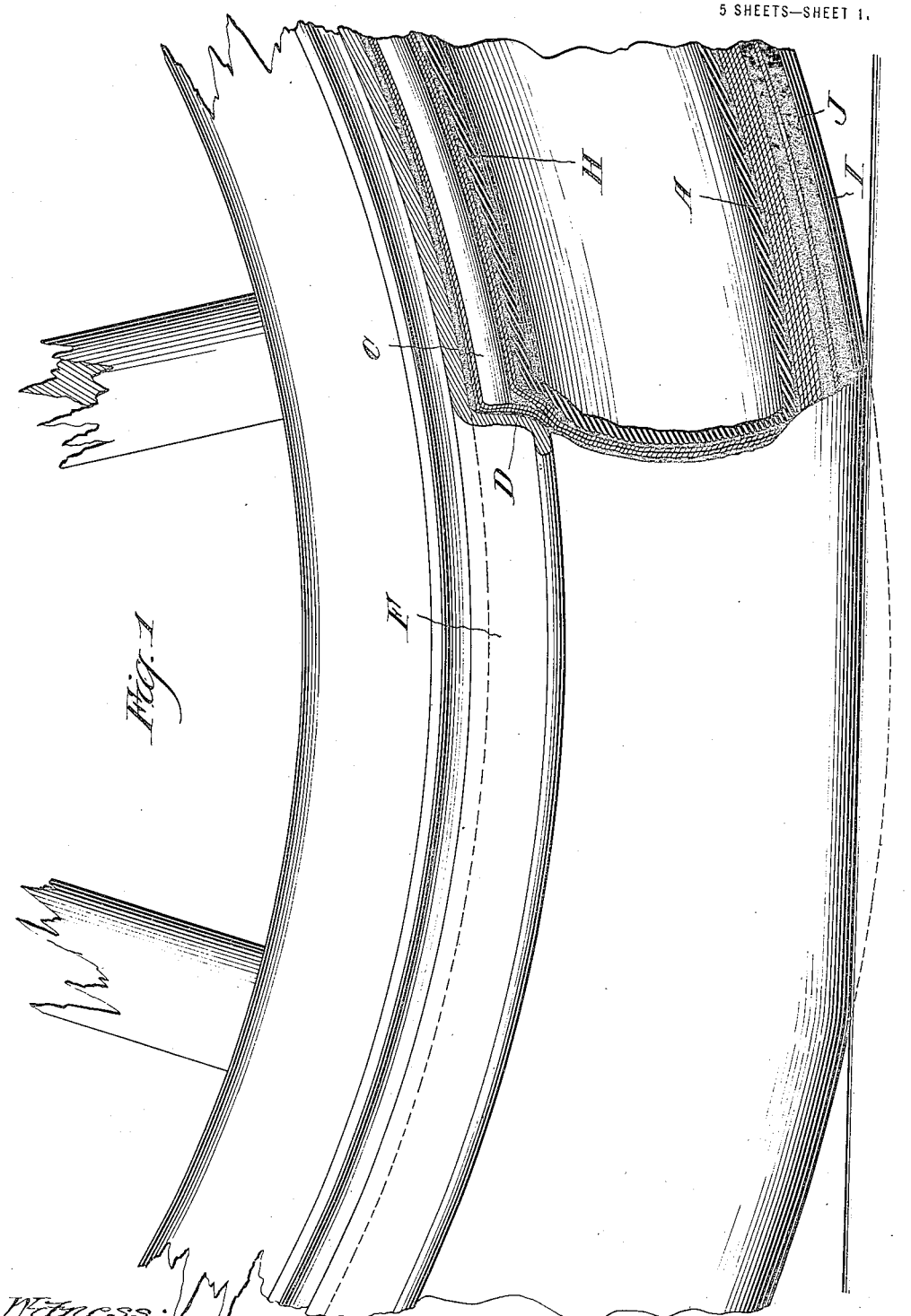

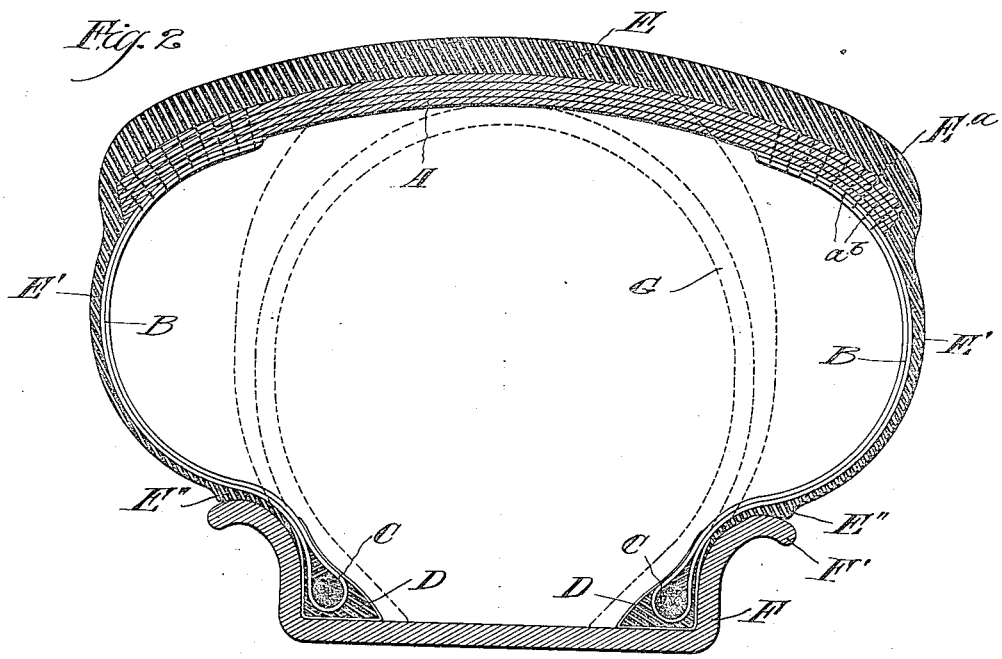
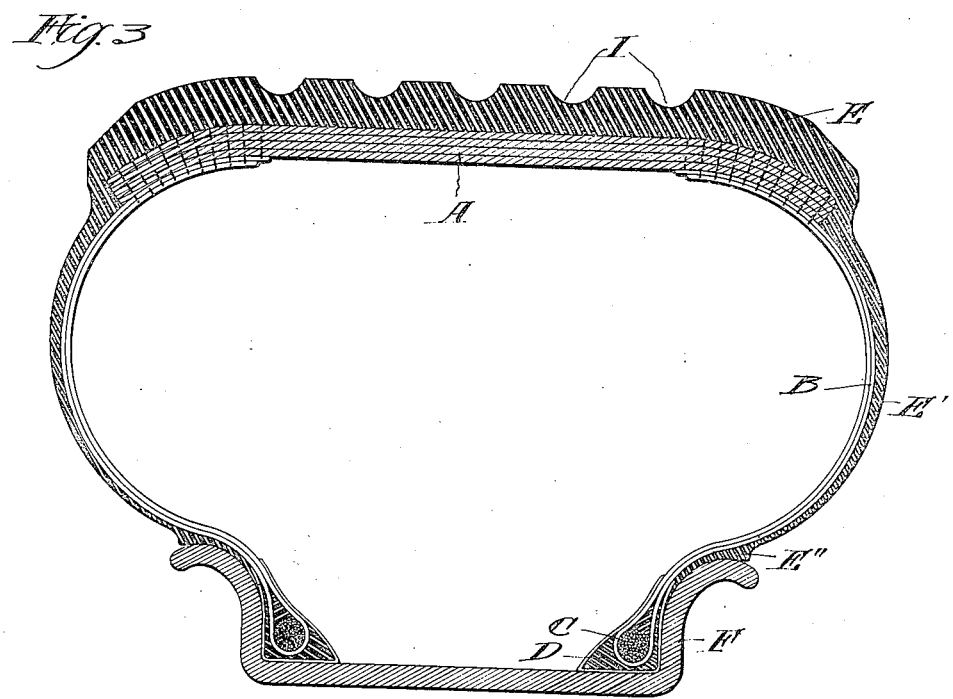

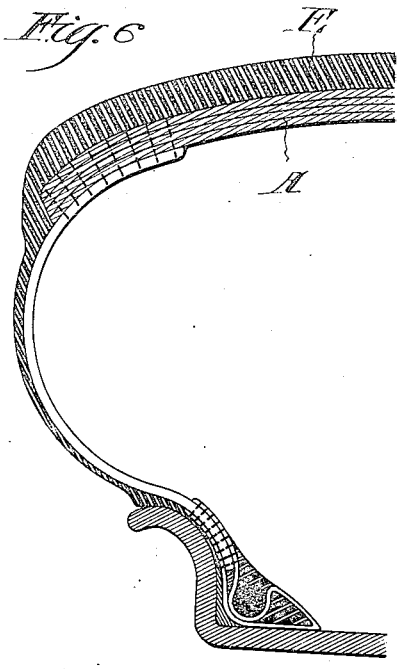
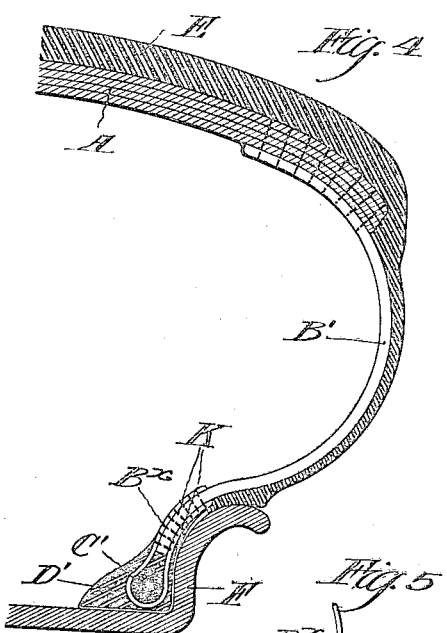
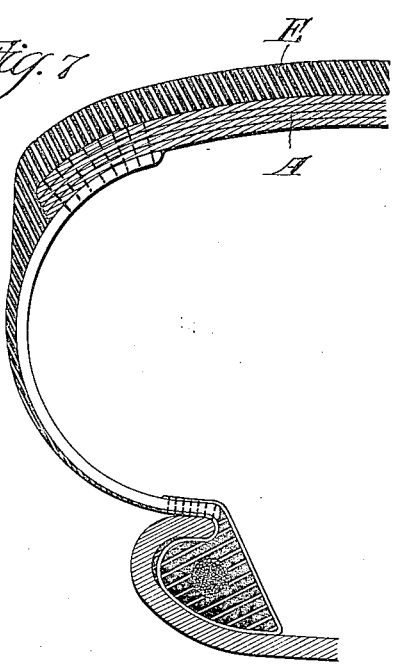
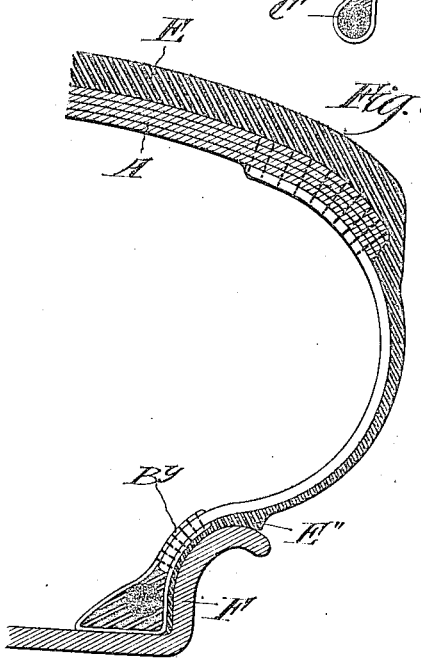

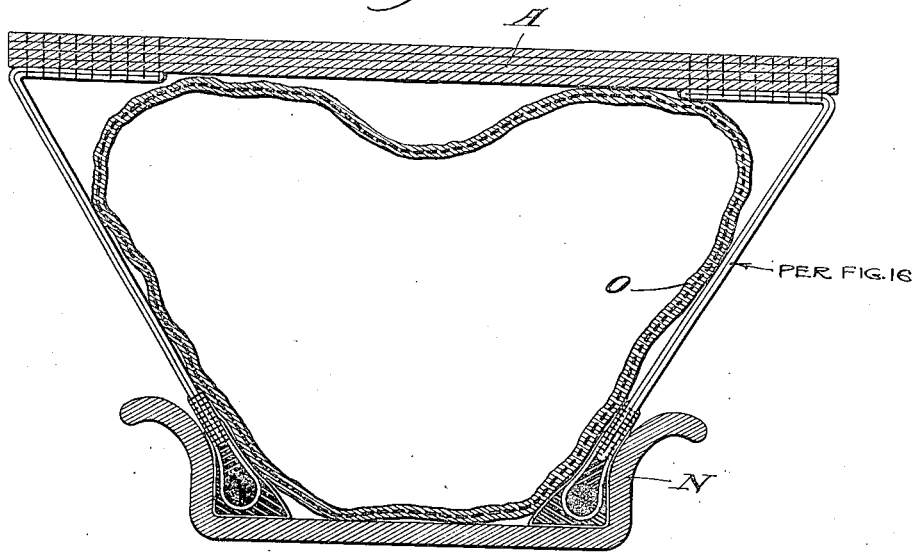
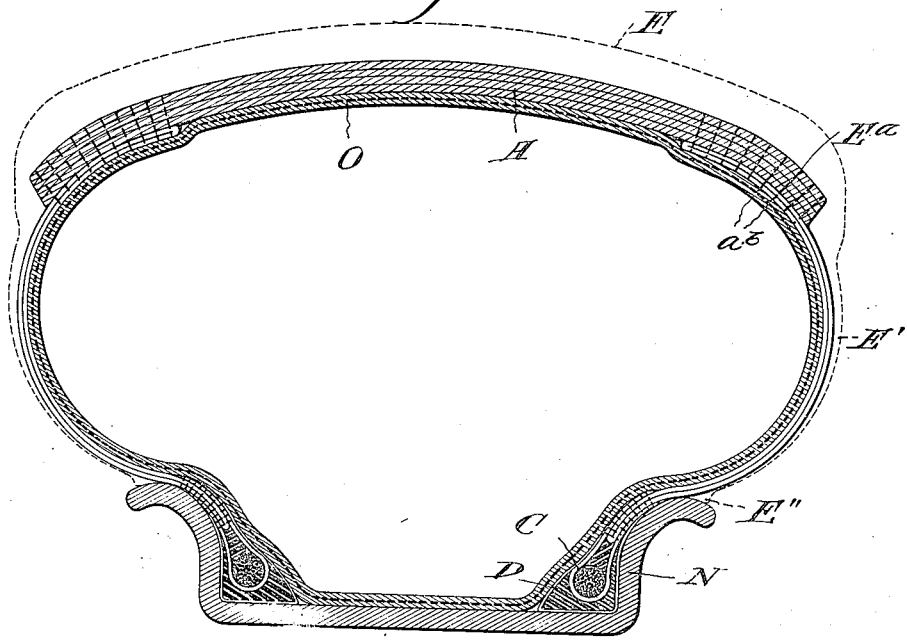

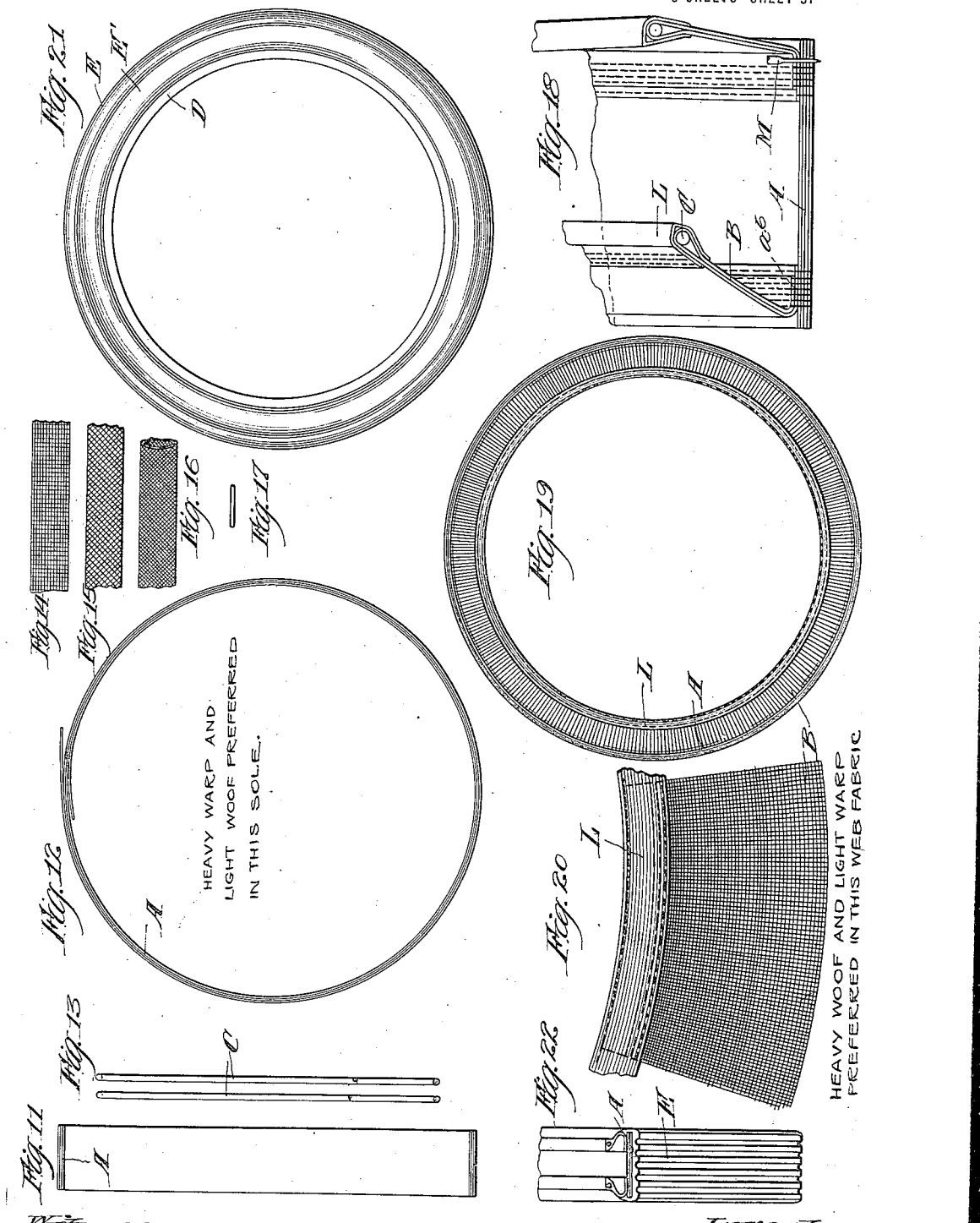

1,433,008

UNITED STATES PATENT OFFICE.

CHARLES GILBERT HAWLEY, OF CHICAGO, ILLINOIS.

PNEUMATIC TIRE.

Application filed December 10, 1917. Serial No. 206,447.

*To all whom it may concern:*

Be it known that I, CHARLES GILBERT HAWLEY, a citizen of the United States, and a resident of the city of Chicago, county of Cook, and State of Illinois, have invented certain new and useful Improvements in Pneumatic Tires, of which the following is a specification.

My invention relates generally to improvements in pneumatic tires for both light and heavy motor vehicles.

The object of my invention is to provide a greatly improved substitute for the pneumatic tires which are now in general use; in other words, to provide a pneumatic tire which shall be safer; cheaper; more durable; less liable to blow out; less likely to skid; more resilient and satisfactory as a road cushion; having its materials better disposed for economy and wear; which may be used upon ordinary rims, as should a true substitute; which shall require less engine power for its propulsion upon the road; which shall be less destructive to the roads over which it passes and tend rather to improve them; which shall require a less degree of inflation; which may have more flexible walls and be of less weight; which will require less skilled labor in its production; which may be produced by machinery, more rapidly and with more certain uniformity; which shall be less liable to puncture, because more effectively treaded and less solidly inflated; which shall be of the same altitude as an ordinary tire but of greater width with consequent improvement in all its conditions, and which, when desired, may serve in place of an ordinary tire of larger size; which shall contain less fabric and less rubber, and safely, the less expensive forms and kinds of these materials; which shall contain less rubber in proportion to its width; which shall be of a construction permitting the tread and side portions to be directly and separately proportioned to load and service requirements; which shall readily adapt itself to any desired form of tread, smooth, rough, studded or composite; in which the uneven stretching of the fabric shall be avoided; which may be as easily, if not more easily repaired, and at less expense; which shall be as easy, or easier, to mount and demount upon its rim; which shall be of a construction that shall enable the safe and effective incorporation of puncture-proof materials in its tread portion; which may be made by fewer and less costly machines and mechanical equipment; and in the manufacture of which the use of heavy core molds may be eliminated.

I obtain these objects and advantages in a tire construction which is so simple that the invention will immediately be understood by one skilled in the art, on reference to the accompanying drawings and the following detailed description:

In said drawings, Fig. 1 depicts a pneumatic tire embodying my invention in position upon its rim and wheel; Fig. 2 is a cross section of my novel tire, the view being made comparative by the inclusion of the dotted lines which depict an ordinary pneumatic tire; Fig. 3 illustrates a slight modification of the structure wherein the tread is flatter; Fig. 4 illustrates my preferred method of forming the base beads of the tire; Fig. 5 is an explanatory detail to be read in connection with Fig. 4; Figs. 6, 7, and 8 illustrate alternative modifications of the tire bead construction; Fig. 9 is a cross-section depicting the condition of the sole and the side webs of the carcass at the moment preceding the initial inflation thereof; Fig. 10 is a like section showing the carcass inflated, ready for the application of the rubber or the other tread; Figs. 11 and 12 illustrate the sole of the tread and the method of preparing it; Fig. 13 shows the two anchors or endless cables which are included in the base beads of the tire; Figs. 14, 15, 16, and 17 illustrate various weaves of fabric which may be used for the sides or side webs of the tire carcass; Fig. 18 is a perspective view illustrating the method of attaching the webs to the sole; Fig. 19 is a side view of the completed carcass in readiness for the operation depicted in Figs. 9 and 10; Fig. 20 is an enlarged detail illustrating the proper disposition of the load-carrying threads in the side webs of the tire; Fig. 21 is a side view of the completed tire; and, Fig. 22 is a perspective section of the completed tire ready for a service rim.

To one skilled in the art, Fig. 2 of the drawings will be most intelligible. As there shown, A represents what I have termed the sole or sole-portion of the tire carcass; B, B represent the sides or side webs of the carcass; C, C represent inextensible rods or cables which take the pull of the side webs and which are vulcanized within respective base beads, D; E, is a rubber-tread; E' is a thin coating, as of rubber, upon the side walls; E'' is a coating of rubber which I term the sub-base of the tire, each side of the tire having such a sub-base.

It will be understood that all of the parts thus defined are completely circular as required to complete a circular or endless tire.

F represents a straight side rim of well-known cross section and usually demountable.

Unless this rim is of the Baker or transplit type, it must be circumferentially separable, to admit the mounting and demounting of the non-stretchable tire bases.

The dotted lines, G, represent an ordinary pneumatic tire suited to the rim, F; and it will be noted that the ordinary tire contains an air cavity that is substantially circular in cross section, whereas the air cavity of my tire is oblong or elliptical.

The transverse curvature of the tread of my tire is nearly flat as compared with the ordinary tire, and, considered in the usual running contact condition, is several times as wide as the tread of the ordinary tire.

The sole, A, is made up preferably of several wrappings or layers of selvaged cotton belting, as indicated in Figs. 10 and 12. When the sole has been wound in this form, its layers may be either temporarily or permanently stitched together on an ordinary sewing machine, and this whether or not the fabric has been pre-treated with rubber.

It will be noted that the side walls, B, of my tire are very much thinner than the sole. This is made possible by the fact that the sum total of the internal pressure tending to burst the sole is much greater than the aggregate pressure tending to burst the side walls of a tire; and the thinner walls are greatly to be desired on account of their greater flexibility, and, as flexibility is increased, the danger of blow-outs diminishes.

I do not attempt to stretch or distort any part of the fabric composing the carcass for the mere purpose of making it conform to a mould core, but instead merely stitch together the overlapping edges of the parts, A and B, using threads, $a^b$, of sufficient number to make these joints as strong as or stronger than the webs, B. As before intimated, the stitching of the tread layers may extend from edge to edge thereof; the rows of stitches need only extend circumferentially or longitudinally thereof. Cross stitching is rarely other than superfluous. As shown in Figs. 2 and 3, the two layers comprising the side wall, B, may be composed of a fold of cotton fabric, the fold or loop of which embraces the cable, C, and the free edges being sewed to the sole, A.

It will be understood that an inner tube is used within the tire shown in Fig. 2, the same, in conformity with best practice, being separate therefrom, though it may be vulcanized to the inner walls of the tire. I have not thought it necessary to illustrate the inflating valve, though the inner tube, H, is illustrated in Fig. 1.

The function of the somewhat extended base beads containing the cables, C, and vulcanized on the inner edges of the carcass, is to prevent the blowing under of the inner tube, to prevent the side from blowing over or off the rim, and particularly to forcibly grip the rim, F, and thus prevent relative rotation between the tire and the rim. To the safety and clutching effects of these cables and base beads, I add the gripping or clutching effect of the sub-bases, E'', to-wit, those portions of the side walls which sweep upwardly and outwardly over the flanges, F', of the rim. Furthermore, these sub-base beads serve markedly to increase the width of the effective base of the tire as measured across the rim.

My ability to maintain the flatness of the tread is due, first, to the fact that the sole is composed of straight woven (not bias) fabric; and, second, is due to the equal reaction between the widened base and the opposed inner surface of the sole or tread. The downward or inward curvative observed at the edges, $E^a$, of the sole, and the outward curvature of the side walls, B; is due to the tendency of the pressure to cause all parts which extend beyond the re-action base to take on the familiar circular form of any flexible tube containing air under pressure.

The greatest radial distention of the sole, A, by the force of the contained air is effected on the middle plane of the tire, and from that plane toward each side of the tire there is a conflict of the radial and lateral pressure effects which causes the contraction of the sole toward its edges and a general harmonizing of the curves of the sole and of the side walls.

Fig. 2 illustrates a sole which has been initially formed substantially without any of the stretch being taken out of the belting or fabric. By increasing the tension upon the sole fabric at the time of wrapping or winding it (as depicted in Fig. 12) the stretch or slack may be so far taken out of the longitudinal threads as to make the sole, and hence its middle longitudinal part, unstretchable by the force of the air with which the tire is later inflated. Under such conditions the inflated tire will present the flat tread appearance depicted in Fig. 3. But still the edge portions of the sole will be drawn inward or curved by the pull of the side walls that tend to take on the natural circular form.

The manner of applying the rubber covering, including the thick tread, will be explained hereinafter. Meantime it is sufficient to note that the tread is so nearly of the over-all width of the tire as to effectively protect the side walls, B, E'. As illustrated in Fig. 3, I prefer that the rubber tread shall contain a plurality of anti-skidding pockets, preferably a number of circumferential grooves, I. These are formed at the time the tread is vulcanized.

Reverting to Fig. 1 it will be noted that in some cases I may use in the tread a breaker strip, J, which may comprise one or more layers or wraps of some puncture-proof material, such as raw silk cloth. Obviously, almost any material may be added to the tread with greater facility and with better results than in the case of the ordinary pneumatic tire.

Before proceeding to describe the method of making my tire, I wish to refer to a preferred side-wall and base-bead construction which I have shown (in several forms) in Figs. 4 to 8. As there indicated, I prefer that the side walls, B', shall comprise single or multiple ply webs which are separate from the direct means of attachment to the base beads and cables. In other words, I provide means for connecting the cables with the side walls, in a separate stage or step of the process of manufacture. The connection preferably comprises a fold of stout cloth, $B^x$, which is wrapped around the cable, C', and has its edges sewed to the inner edge of the part, B', by several rows of thread stitches, K. The formation of the seam at this point in no way weakens the structure, but rather strengthens it, for that part which lies directly against the vertical wall of the rim never moves (is never flexed) while under stress in service. The initial form of the connector is illustrated in Fig. 5, wherefrom it will appear that I preferably place the strip or ring of fabric, $B^x$, on the endless cable with a wrapper and filling D'', of rubber and afterwards sew the flaps of the connector to the side web, B'. The forming of the remainder of the base bead, D', may be completed at the same time the connector is prepared, in which case the contained rubber composition, D'', and that contained in the wrapper of the base, $D^1$, will be converted into a relatively hard rubber condition before the beads are attached and prior to the vulcanization of the other rubber parts of the tire. The same method of separately forming the base connections and base beads may be followed out in the case of beads of other forms, as clearly indicated by Figs. 6, 7, and 8. Fig. 6 differs from Fig. 4 in that it shows a base bead of the reverse-bead type. Fig. 7 illustrates a clincher bead: and Fig. 8 a prevulcanized cable-containing bead and its cloth binder, $B^y$ which is later stitched to the side web and serves as the coupling between the same and the base bead.

In every case I form the sole, A, of the carcass with main threads which extend circumferentially or longitudinally. These may always be as strong as or stronger than the transverse threads. Particularly good results will be secured from a sole fabric in which the transverse threads are merely strong enough to resist the tearing pull of the stitched-on side walls, B'. For the side webs I may use straight woven fabric and to prevent objectionable wrinkles may depend upon compacting the radial or cross threads thereof upon the smallest circumference, as shown in Fig. 20. To assist in thus compacting them I may "tuck" them within a cloth binding or edge braid, L, in a manner familiar to operatives of sewing machines. Less advantageous, is a side web formed of fabric cut on the bias, though such webs do not wrinkle. As the most advantageous material I prefer a cloth comprising a bias or whip covering tubular weave, as indicated in Fig. 16, the tube being flattened as shown in Fig. 17, at the time its edges are sewed to the sole and to the base bead connector. Obviously such a fabric readily conforms to the condition depicted, without wrinkling. Wherever it is not possible to secure the weaving of the side webs in circular form, it will be necessary to overlap and stitch together the ends thereof.

The very simple method of connecting the sole and the side webs is depicted in Fig. 18, the same consisting in sewing them together with an adequate number of rows of thread stitches. The part marked, M, represents the sewing machine needle. Obviously the same method is followed in attaching the base beads.

From the foregoing it should appear that I prefer to assemble the several parts in a dry state; that is, preferably before the cloth or fabric has been impregnated with rubber. Unlike the ordinary tire carcass, my novel carcass retains its initial shape in this dry state, and it is thereafter not difficult to hold the parts while sewing them; and the dry condition makes the handling thereof by the operatives more comfortable and speedy.

To compensate for the lack of the initial rubber coating, I impregnate the carcass as a whole after it is completed. This is accomplished by acting on the carcass in an ordinary impregnating tank containing the fluid rubber composition. Such impregnating processes are so well understood that I deem it unnecessary to either illustrate or describe the same herein.

The properly impregnated and then limp carcass having been completed, it is in readiness for final formation. This should and virtually must occur before a rubber covering can properly be put upon it. Therefore, as a next step I mount the limp carcass upon a temporary mold or rim, N, first placing within it what is known as a curing air bag, O. It will be understood that at that time the carcass is of its full strength to resist the bursting pressure of inflation, its parts having all been sewed together. I then inflate the air bag at a pressure approximating a service pressure, and thereby stretch the carcass and cause it to assume its final cross-sectional shape. As previously explained, this cross-sectional shape will vary (see Figs. 2 and 3) according to whether or not the sole has been previously stretched.

Arriving at the condition depicted in Fig. 10, and while the air bag still holds the carcass in that condition, I lay upon it such covering of rubber composition and such other additions as may be necessary or desirable for the formation of a road surface tread, E, protecting layers, E', and sub-base parts, E". This having been done, that is, the raw tire having thus been completed, it is then in readiness to be placed within the final vulcanizing mold, and there vulcanized. I have thought it unnecessary to illustrate such a mold, but it may be explained that it is of a character which permits the retention of both the rim, N, and the air-bag, O, until the vulcanizing process is completed. Thereupon those, and the other parts of the mold, are removed, the completed tire is found ready to pass on to the stockroom or warehouse.

A person who is skilled in the art will now understand that I have in fact attained in this tire the several objects and advantages set forth in the opening of this specification.

I desire further to specially accentuate several important points.

Chief among these is the matter of the action of the tire upon the road. In the first place, as the tread of the tire is substantially flat, the tire moves over the road with only a slight flexing action in the tread portion. The outward curvature or arch of the tire is of such low altitude in proportion to its spread or span that it readily yields to the rolling pressure. In consequence the road surface is flattened and smoothed by the rolling tire and there is no violent reflex action of the arch of the tread to disrupt the road surface. It seems not to be generally understood that the destructive action of the ordinary tire is not so much due to the positive crushing impact at the forward edge of the road contact area, nor so much to the suction of the progressively flattened part, as to the violent breaking-out or reflex action at the back of the tire, as the progressively flattened high arch of the tread is released and springs back to its normal curvature under the expulsive action of the highly compressed air within the tire. It is this kicking out or reflex action which I find to be the chief agent in the destruction of automobile road surfaces, and which I have practically eliminated and at least reduced to a negligible factor by constructing my tire with a substantially flat sole. Merely to make a flat surface tread, would not accomplish this in the case of the ordinary tire for its carcass would still remain highly arched. In the case of my tire, the transverse deformation of the tire is reduced to a minimum, and hence its "kick" on returning to normal is so slight as to leave the road surface undisturbed.

By reason of the great widening or lateral extension of the air chamber which I have accomplished in my tires, they are made capable of sustaining their loads with an internal air pressure which is only a fraction of the pressure in an equivalent ordinary tire. The diminution of air pressure has many important effects, to-wit, the ability to sustain loads and road shocks with less internal pressure, means that the whole tire carcass may be proportionately lighter and thinner, in the parts which are much flexed, and hence less costly, more flexible, more durable, and yet adequate for the transmission of the driving and braking torques of the wheels.

The successful widening of the tire and particularly the widening of the actual area of contact or tread upon the road, adapts the tire for travel over sandy and soft roads, with an expenditure of engine power no greater than that expended in driving ordinary tires over good roads. The widening of the tire also makes it available for the carrying of heavy loads at either low or high speeds, the only modification necessary for high speed use being a slight strengthening of the side walls to correspond with an increase in inflation pressure.

The construction of the tire in the sectional form explained, makes it possible to employ, with any side webs sufficient to sustain the air pressure, either a very light and flexible sole, as for racing purposes; or a heavy sole, for heavy duty work.

A matter of great importance rests in the employment of the sub-bases explained, which completely eliminate liability to rim cutting; and possibility of loss of the tire from the rim, short of the breaking of one of the inextensible cables or anchors.

The sectional formation of the tire, and the stitching together of its parts, make it possible to manufacture these tires by a class of labor never before used, and also greatly facilitate the up-keep and repair of the tire.

The importance of the easy driving quality or character of my tire cannot be over-estimated. It will be understood that this is the result chiefly of diminishing the arch height and rigidity of the sole or tread portion of the tire, also of the making of the sole flexible, and also from the use of thinner and hence flexible, side walls. It has been determined that in ordinary every-day practice nearly fifty per cent of the power of a motor vehicle engine is consumed in a mere propulsion of the pneumatic tires, and obviously the great reduction in the rolling resistance which I have accomplished in my tires means an enormous freeing of the power of the engine for actual propulsion of the vehicle and its load.

Having thus described my invention, I claim as new and desire to secure by Letters Patent:

1. A base bead for pneumatic tires, including a substantially non-stretchable metal part, or cable and a cloth flap anchored thereon with outwardly extending free edges to be stitched to the inner edges of a tire carcass.

2. A side web for a pneumatic tire, comprising a ring fabric wherein the threads are compacted upon the small circumference.

3. A side web for a pneumatic tire, comprising a ring of fabric wherein the threads are compacted upon the small circumference, in combination with an inextensible base bead attached to the web edge of the smaller circumference.

4. A side web for a sectional pneumatic tire, comprising a ring of fabric wherein the threads extend substantially at tangents to the smaller circumference of the ring.

5. A pneumatic tire carcass comprising a sole and two side webs lapping the edges thereof and sewed thereto.

6. A pneumatic tire carcass comprising a sole, two side webs sewed to respective edges of the sole, and base beads sewed to the inner edges of the side webs.

7. A pneumatic tire carcass comprising a sole composed of fabric wherein the warp extends circumferentially in combination with side webs of fabric stitched to said sole and base beads applied to the inner circumferences of said webs.

8. A pneumatic tire carcass comprising a sole composed of fabric wherein the warp extends circumferentially, in combination with side webs of fabric stitched to said sole and base beads stitched to the inner circumference of said webs.

9. A pneumatic tire comprising an initially cylindrical and circumferentially non-stretchable sole composed of several wraps or turns of thin belting, in combination with laterally bulged transversely non-stretchable side webs secured to respective edges of said sole, and base beads applied to the inner circumferences of said webs, substantially as described.

10. A pneumatic tire comprising an initially cylindrical and circumferentially non-stretchable sole composed of several layers of canvas belting, in combination with laterally bulged transversely non-stretchable side webs secured to respective edges of said sole, base beads applied to the inner circumferences of said webs, and an external covering of elastic composition, including a thick tread portion that is co-extensive with said sole.

11. A pneumatic tire comprising an initially cylindrical and non-stretchable sole, in combination with laterally bulging, transversely non-stretchable side webs sewed to respective edges of said sole, and non-stretchable base beads applied to the inner circumferences of said webs, and an external covering of elastic composition.

12. A pneumatic tire comprising an initially cylindrical and non-stretchable sole, in combination with laterally bulging, transversely non-stretchable side webs sewed to respective edges of said sole, and non-stretchable base beads applied to the inner circumferences of said webs, and an external covering of elastic composition, including sub-base portions adjacent said beads.

13. A pneumatic tire carcass component, comprising the herein described sole, formed of several circumferential wraps of canvas belting stitched together.

14. A pneumatic tire carcass component, comprising the herein described sole formed of several circumferential wraps of canvas belting stitched together, the warp threads of said belting extending circumferentially of the carcass, and the sole, as a whole, being substantially non-stretchable.

In testimony whereof, I have hereunto set my hand this 5th day of December, 1917.

CHARLES GILBERT HAWLEY.